US008110521B2

(12) United States Patent
Lee et al.

(10) Patent No.: US 8,110,521 B2
(45) Date of Patent: Feb. 7, 2012

(54) SYNTHESIS METHODS OF CORE-SHELL NANOPARTICLES ON A CARBON SUPPORT

(75) Inventors: Jae Seung Lee, Gyeonggi-do (KR); Yung-Eun Sung, Gyeonggi-do (KR); Tae-Yeol Jeon, Seoul (KR); Hee-Young Park, Gyeongsangnam-do (KR)

(73) Assignees: Hyundai Motor Company, Seoul (KR); SNU R&DB Foundation, Seoul (KR)

( * ) Notice: Subject to any disclaimer, the term of this patent is extended or adjusted under 35 U.S.C. 154(b) by 13 days.

(21) Appl. No.: 12/752,728

(22) Filed: Apr. 1, 2010

(65) Prior Publication Data
US 2011/0129763 A1 Jun. 2, 2011

(30) Foreign Application Priority Data

Nov. 30, 2009 (KR) ........................ 10-2009-0117211

(51) Int. Cl.
| | |
|---|---|
| B01J 21/18 | (2006.01) |
| B01J 23/00 | (2006.01) |
| B01J 23/40 | (2006.01) |
| B01J 23/74 | (2006.01) |
| H01M 4/02 | (2006.01) |
| H01M 4/36 | (2006.01) |
| H01M 4/90 | (2006.01) |
| H01M 4/92 | (2006.01) |
| H01M 4/94 | (2006.01) |
| B32B 5/16 | (2006.01) |
| B32B 9/00 | (2006.01) |
| B32B 15/02 | (2006.01) |
| B32B 17/02 | (2006.01) |
| B32B 19/00 | (2006.01) |
| B32B 21/02 | (2006.01) |
| B32B 23/02 | (2006.01) |
| B32B 27/02 | (2006.01) |

(52) U.S. Cl. ........ 502/185; 502/180; 502/182; 429/523; 429/524; 429/525; 429/526; 429/527; 428/402; 428/403

(58) Field of Classification Search .................. 502/180, 502/182, 185; 429/523–527; 428/402, 403
See application file for complete search history.

(56) References Cited

U.S. PATENT DOCUMENTS
7,053,021 B1 * 5/2006 Zhong et al. .................. 502/185
(Continued)

FOREIGN PATENT DOCUMENTS
JP 2005-273011 A 10/2005
(Continued)

OTHER PUBLICATIONS

"Voltammetry of Quinones in Unbuffered Aqueous Solution: Reassessing the Roles of Proton Transfer and Hydrogen Bonding in the Aqueous Electrochemistry of Quinones," May Quan et al. J. Am. Chem. Soc. 2007, 129, pp. 12847-12856.*

(Continued)

Primary Examiner — Patricia L Hailey
(74) Attorney, Agent, or Firm — Edwards Wildman Palmer LLP; Peter F. Corless

(57) ABSTRACT

The present invention features a method for preparing core-shell nanoparticles supported on carbon. In particular, the present invention features a method for preparing core-shell nanoparticles supported on carbon, including: dispersing core nanoparticle powder supported on carbon in ethanol; adding a metal precursor which forms a shell and hydroquinone thereto; and mixing and reducing the same. Preferably, the disclosed method for preparing core-shell nanoparticles supported on carbon enables coating of transition metal nanoparticles including platinum on the surface of core metal nanoparticles at a monolayer level. Prepared core-shell nanoparticles of the present invention may be useful as catalysts or electrode materials of fuel cells.

7 Claims, 3 Drawing Sheets

U.S. PATENT DOCUMENTS

| | | | | |
|---|---|---|---|---|
| 7,205,255 | B2 * | 4/2007 | Yamamoto | 502/101 |
| 7,691,780 | B2 * | 4/2010 | Adzic et al. | 502/339 |
| 2007/0290175 | A1 * | 12/2007 | Kim | 252/500 |

FOREIGN PATENT DOCUMENTS

| | | |
|---|---|---|
| JP | 2008-248298 A | 10/2008 |
| KR | 10-2006-0082595 A | 7/2006 |
| KR | 10-0823094 | 3/2008 |
| KR | 10-2008-0045155 | 5/2008 |

OTHER PUBLICATIONS

"Hydrogen-Bonding and Protonation Effects in Electrochemistry of Quinones in Aprotic Solvents," Neeraj Gupta et al. J. Am. Chem. Soc. 1997, 119, pp. 6384-6391.*

"A Polarographic Investigation into the Redox Behaviour of Quinones: The Roles of Electron Affinity and Solvent", M. E. Peover. J. Chem. Soc. 1962, pp. 4540-4549.*

"PtRu overlayers on Au nanoparticles for methanol electro-oxidation," Kug-Seung Lee et al. Catalysis Today 146 (2009), pp. 20-24.*

"Performance and stability characteristics of MEAs with carbon-supported Pt and PtNi1 nanoparticles as cathode catalysts in PEM fuel cell," Yong-Hun Cho et al. International Journal of Hydrogen Energy 36 (2011), pp. 4394-4399.*

"Enhanced activity of Pt-based electrocatalysts for oxygen reduction via a selective Pt deposition process," Tae-Yeol Jeon et al. Journal of Electroanalytical Chemistry (2011), pp. 1-10.*

Hofmeister et al., "Metal Nanoparticle Coating of Oxide Nanospheres for Core-Shell Structures", Part. Part. Syst. Charact., vol. 19, pp. 359-365 (2002).

* cited by examiner (a)                          (b)

SYNTHESIS METHODS OF CORE-SHELL NANOPARTICLES ON A CARBON SUPPORT

CROSS-REFERENCE(S) TO RELATED APPLICATIONS

This application claims under 35 U.S.C. §119(a) the benefit of Korean Patent Application No. 10-2009-0117211, filed on Nov. 30, 2009, the entire contents of which are incorporated herein by reference.

BACKGROUND OF THE INVENTION

1. Field of the Invention

The present invention relates, generally, to a method for preparing core-shell nanoparticles, comprising dispersing core nanoparticle powder supported on carbon in ethanol, adding a metal precursor which forms a shell and hydroquinone thereto, and mixing and reducing the same. In particular, the core-shell nanoparticles prepared in accordance with the present invention may be usefully used as catalysts and electrode materials of fuel cells.

2. Description of Related Art

A fuel cell, which transforms chemical energy resulting from the oxidation of fuel directly into the electrical energy, is considered to be the next-generation energy source. Particularly, in automobile-related fields, research is actively carried out because fuel cells have advantages in improved fuel efficiency, reduced emission, environment friendliness, or the like.

Proton exchange membrane fuel cells (PEMFCs) and direct methanol fuel cells (DMFCs), which are representative fuel cells, use catalyst materials prepared by dispersing nanoparticles of platinum or transition metal alloy including platinum on a carbon support as electrode materials. However, since the typical electrode material platinum is expensive and its reserves are limited, research has been actively carried out to considerably reduce the use of platinum or to replace it with other material. As a way of reducing the use of platinum, a method of forming a core-shell structure by coating platinum only on the surface of core metal has been proposed. The core-shell structure is reported to have enhanced activity of oxygen reduction since the surface alloy of the core metal with platinum weakens the strong binding between pure platinum and anions and reaction intermediates (OH) formed during the oxygen reduction (Stamenkovic, V. R. etc., Science, vol. 315, p. 493).

Coating of the dissimilar metal on the metal nanoparticle surface may be accomplished by chemical reduction or electrochemical coating.

Preferably, the chemical reduction may be performed by preparing and drying core nanoparticles and then coating surface metal thereon in another solution, or by adding a surface metal reagent in the same synthesis solution without drying to selectively reduce the surface. Among the surface alloys, coating of transition metals including platinum on gold nanoparticles has been studied the most. Gold is basically hydrophobic and forms very weak or no bonding with organic substances including oxygen when compared with other transition metals. Thus, gold particles have high surface energy in water because water molecules are hardly adsorbed thereon. For this reason, other transition metals may be coated well on the gold particles in water. Japanese Patent Laid-Open No. 2005-248298, incorporated by reference in its entirety herein, discloses a method of coating copper on silver core particles by reducing a silver precursor and a copper precursor sequentially by heating. However, research has not focused on methods of coating a less reactive metal on particles of highly reactive precious metal, e.g. coating of platinum on nickel or palladium, as yet.

In certain examples, the electrochemical coating may be suitably performed by reducing copper ion dissolved in an electrolyte solution by controlling the voltage of an electrode and then allowing platinum to be coated due to the reduction potential difference of platinum ion and copper ion. For instance, Korean Patent Publication No. 2008-045155, incorporated by reference in its entirety herein, discloses a method of coating copper on platinum nanoparticle core and then replacing the copper with gold. However, this method is inapplicable to metals having a reduction potential lower than that of copper. In addition, copper may remain without being completely replaced by platinum and thus act as an impurity. There is a method of reducing cobalt nanoparticles and then coating allowing platinum to be coated due to reduction potential difference, which is based on the same principle. However, this method is associated with a problem of core metal loss since platinum ion is reduced and coated on the surface in exchange for the dissolution of surface atoms.

The above information disclosed in this the Background section is only for enhancement of understanding of the background of the invention and therefore it may contain information that does not form the prior art that is already known in this country to a person of ordinary skill in the art.

SUMMARY OF THE INVENTION

In one aspect, the present invention provides a method for preparing surface alloy nanoparticles, which is capable of coating various transition metals including platinum on the surface of core nanoparticles at a monolayer level.

In preferred embodiments, the present invention provides a method for preparing core-shell nanoparticles supported on carbon, including: dispersing core nanoparticle powder supported on carbon in ethanol to prepare a dispersion; adding a metal precursor which forms a shell and hydroquinone to the dispersion to prepare a mixture solution; and coating the shell metal on the core nanoparticles by reducing the mixture solution by heating.

Preferably, the method for preparing core-shell nanoparticles supported on carbon according to the present invention enables coating of transition metal nanoparticles including platinum on the surface of core metal nanoparticles at a monolayer level even at low temperature of around 70° C. Thus, it can considerably reduce the use of platinum or other precious metals and the core-shell nanoparticles prepared by the methods of the invention may be useful as catalysts or electrode materials of fuel cells.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

DESCRIPTION OF THE DRAWINGS

The above and other objects, features and advantages of the present invention will become apparent from the following description of preferred embodiments given in conjunction with the accompanying drawings, in which.

Figure 1:
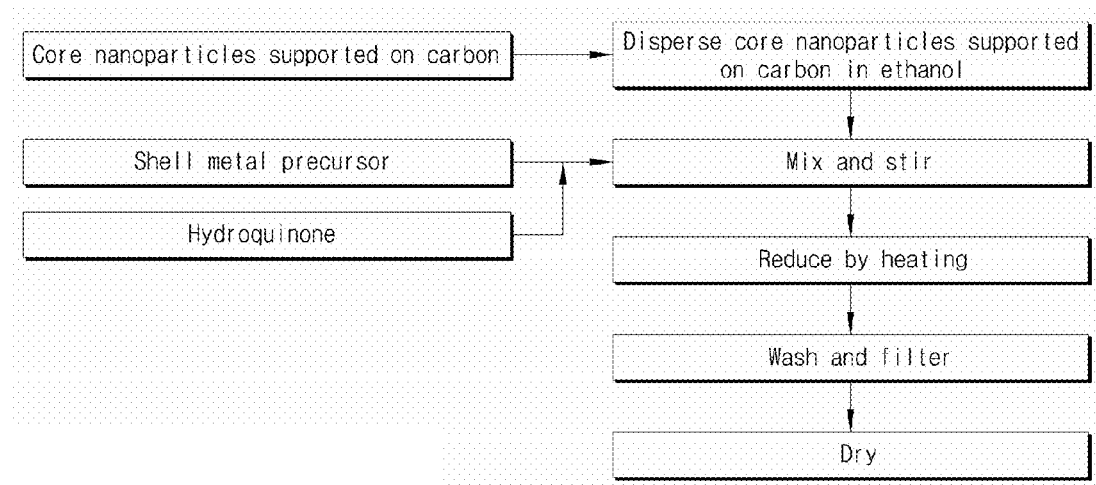
FIG. 1 schematically shows a process of preparing core-shell nanoparticles supported on carbon.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DESCRIPTION OF SPECIFIC EMBODIMENTS

As described herein, the present invention includes a method for preparing core-shell nanoparticles supported on carbon, comprising dispersing core nanoparticle powder supported on carbon in ethanol to prepare a dispersion, adding a metal precursor and hydroquinone to the dispersion to prepare a mixture solution; and coating the shell metal on the core nanoparticles, thereby preparing core shell nanoparticles supported on carbon.

In one embodiment, the shell metal on the core nanoparticles is coated by reducing the mixture solution by heating.

The invention also features a nanoparticle catalyst prepared by the method according to any one of the aspects featured herein.

The invention also features a fuel cell electrode comprising the nanoparticle catalyst according to any one of the aspects featured herein.

The invention also features a fuel cell comprising the electrode according to any one of the aspects featured herein.

The advantages, features and aspects of the present invention will become apparent from the following description of the embodiments with reference to the accompanying drawings, which is set forth hereinafter.

According to preferred aspects, the present invention provides a method for preparing core-shell nanoparticles, comprising dispersing core nanoparticle powder supported on carbon in ethanol, adding a metal precursor which forms a shell and hydroquinone thereto, and mixing and reducing the same.

In a first embodiment, core nanoparticle powder supported on carbon is suitably dispersed in ethanol to prepare a dispersion. Preferably, in exemplary embodiments of the present invention, ethanol is used as a solvent. Preferably, anhydrous ethanol is used. Ethanol is advantageous in that it is an organic solvent capable of dissolving various solutes, like water, and that it is capable of suitably removing water included in a metal precursor because it is highly miscible with water in the presence of the metal precursor. In further exemplary embodiments, anhydrous ethanol including less water is preferred since formation of oxides on the surface of the core nanoparticles is prevented. In other exemplary embodiments, in case a metal which hardly or weakly reacts with oxygen-containing substance, such as platinum or gold, is used as the core, anhydrous ethanol may not be used. The core nanoparticles may be supported on carbon in an amount of 0.05-0.5 g. Preferably, the ethanol is used in an amount of at least 50 mL. According to other exemplary embodiments, the core nanoparticles used in the present invention may be Ni, Pd, Co or Ir nanoparticles.

According to other exemplary embodiments, a metal precursor which forms a shell and hydroquinone are added to the dispersion to prepare a mixture solution. Chemical reduction and electrochemical coating commonly require a slow reaction for reduction of the metal coated on the surface. Preferably, a quick reaction, which is largely due to a strong reducing agent, involves formation of crystal nuclei, resulting in formation of new particles rather than coating on the surface. In other further embodiments, a slow reaction means a weak reducing power and leads to growth of the core material on the surface. According to certain preferred embodiments, typical weak reducing agents include, but are not limited to, alcohol, formate, ascorbic acid, formaldehyde, etc. depending on the metal used. In certain embodiments of the present invention, a dissimilar metal is suitably coated on the surface using reducing power of the alcohol. In general, alcohol has a reducing power which is insufficient to completely reduce even the metal with high oxidation-reduction potential such as platinum. Although complete reduction may be possible depending on the temperature and the amount of the metal precursor to be reduced, complete reduction is difficult only with pure alcohol. Accordingly, in further exemplary embodiments, a polyol having two or more —OH groups is commonly used as a reducing agent. In preferred embodiments of the present invention, hydroquinone ($C_6H_4(OH)_2$), which is typically used to reduce silver halide, the major component in most photographic developers, to silver, is used as a suitable reducing agent. Preferably, the molar proportion of the metal precursor which forms a shell to hydroquinone added to the dispersion may be freely selected from 1:5 to 1:50. In further preferred embodiments, the metal precursor may be $RuCl_3$, $RhCl_3$, $Pd(NO_3)_2$, $OsCl_3$, $IrCl_3$, $PtCl_4$, or the like. Preferably, an adequate amount of the metal precursor is suitably dissolved in ethanol and then mixed with the dispersion. Then, hydroquinone dissolved in ethanol is suitably mixed with the dispersion to prepare a mixture solution. Preferably, the total amount of ethanol in the mixture solution is at least 1.9 L based on 1 g of the shell metal. It is because a smaller amount of the solvent, i.e. a higher concentration of the metal precursor, may result in agglomeration of platinum particles instead of coating of the core material on the surface even with the weak reducing agent such as hydroquinone.

Preferably, the mixture solution is suitably reduced by heating to coat the shell metal on the core nanoparticles. Preferably, this process is carried out at 70-80° C. under an argon or nitrogen atmosphere.

Accordingly, following washing, filtering and drying, core-shell nanoparticles are obtained as powder. Preferably, the washing is carried out only with ethanol without using water, which is to prevent oxidation of the nanoparticles on the surface.

In preferred embodiments, the shell metal may be ruthenium (Ru), rhodium (Rh), palladium (Pd), osmium (Os) or iridium (Ir), in addition to platinum.

According to the present invention, transition metal nanoparticles including platinum may be suitably coated on the surface of core metal nanoparticles at a monolayer level and, thus, use of platinum or other precious metals may be significantly reduced. Thus prepared core-shell nanoparticles may be useful as catalysts or electrode materials of fuel cells.

EXAMPLES

The following examples are for illustrative purposes only and not intended to limit the scope of the present invention.

Preparation Example

Preparation of 28.6 Wt % (Metal Content) Pd/C Nanoparticles

Oleylamine (TCI, 360 μL) was added to 1,2-propanediol (99.5%, Aldrich, 100 mL) and stirred for 30 minutes. Then, addition of a carbon support (Cabot, Vulcan XC-72R, 0.15 g) was followed by stirring for 30 minutes, ultrasonic dispersing for 30 minutes and then stirring for 30 minutes. Then, palladium acetylacetonate ($Pd(C_5H_7O_2)_2$, 0.1718 g) dissolved in 1,2-propanediol (60 mL) was added to the carbon support solution while stirring. The solution was sufficiently mixed by stirring for over 12 hours. After sufficient mixing, ultrasonic dispersing was carried out for 1-5 minutes before heating the solution. Then, the solution was heated to 110° C. in a reactor under a flowing argon gas atmosphere to prevent penetration of air. After heating for 2 hours at 110° C., 5 molar equivalents of sodium borohydride ($NaBH_4$) based on palladium dissolved in 1,2-propanediol (20 mL) was injected thereto as quickly as possible, while stirring at 850 rpm. After adding a reducing agent, the solution was further stirred for about 60 minutes at the same temperature and at the same stirring speed. Then, the solution was allowed to cool spontaneously while decreasing the stirring speed adequately. Thus cooled solution was washed with ethanol, filtered and dried in a vacuum oven to obtain core nanoparticles as powder.

Example

Preparation of Pd/Pt Core-Shell Nanoparticles Supported on Carbon

In another example, core-shell nanoparticles were prepared by coating 0.3, 0.5, 0.7, 0.9 and 1.1 mol of Pt, based on 1 mol of Pd, on the 28.6 wt % Pd/C electrode material prepared in Preparation Example. Details are as follows.

The Pd/C nanoparticles (0.1 g) were added to anhydrous ethanol (water content 1%, 100 mL) and stirred for about 10 minutes, ultrasonically dispersed for 10 minutes, and then stirred again for 10 minutes. Then, hydroquinone (Aldrich) and $PtCl_4$ (Aldrich) dissolved in anhydrous ethanol in a 20 mL vial were added while stirring. After the addition of hydroquinone and $PtCl_4$, anhydrous ethanol was further added to make the final volume 200 mL. The addition amount of $PtCl_4$ was 0.3, 0.5, 0.7, 0.9 and 1.1 mol per 1 mol of Pd. And, the addition amount of hydroquinone was 20 times the mol of Pt. After stirring for at least 3 hours, the mixture solution was heated at 70° C. for 5 hours in a reactor under an argon gas atmosphere while stirring at about 550 rpm. Then, after spontaneous cooling, followed by washing with ethanol (Samchun Chemical, 95%), filtering and drying in a vacuum oven under an argon gas atmosphere, Pd/Pt core-shell nanoparticles supported on carbon were prepared.

Figure 2:
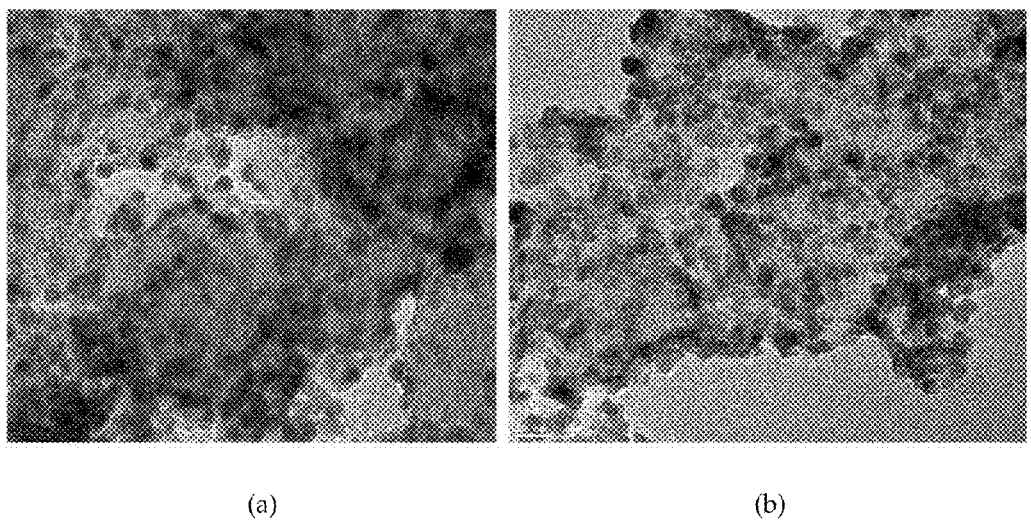
FIG. 2 (a) shows a transmission electron microscopy (TEM) image of 28.6 wt % Pd nanoparticles supported on carbon, and FIG. 2 (b) shows a TEM image of Pd(1)/Pt(0.5) core-shell nanoparticles.

FIGS. 2 (a) and (b) are transmission electron microscopy (TEM) images showing size and shape of the prepared material. FIG. 2 (a) shows a TEM image of the Pd/C nanoparticles. Average particle diameter is about 3.7 nm. FIG. 2 (b) shows a TEM image of the Pd/Pt core-shell nanoparticles prepared by coating 0.5 mol of Pt, based on 1 mol of Pd, on the Pd/C nanoparticles. An average particle diameter is about 4.5 nm. From the TEM images, it can be seen that the particle size increased by the coating of Pt. According to a theoretical calculation, about 0.5 mol of Pt is required based on 1 mol of Pd to coat a perfect monolayer of Pt on spherical Pd particles having a diameter of 3.7 nm. Although the increase in size was slightly larger than the theoretical calculation, which may be due to inaccuracy or local variation of the TEM images, nonuniform Pt coating, oxides or impurities on the surface, or the like, it is certain that the size increased. The difference from the theoretical value may be inevitable in the chemical reduction. However, the shell coating according to the present invention shows much better result than the previous techniques.

Figure 3:
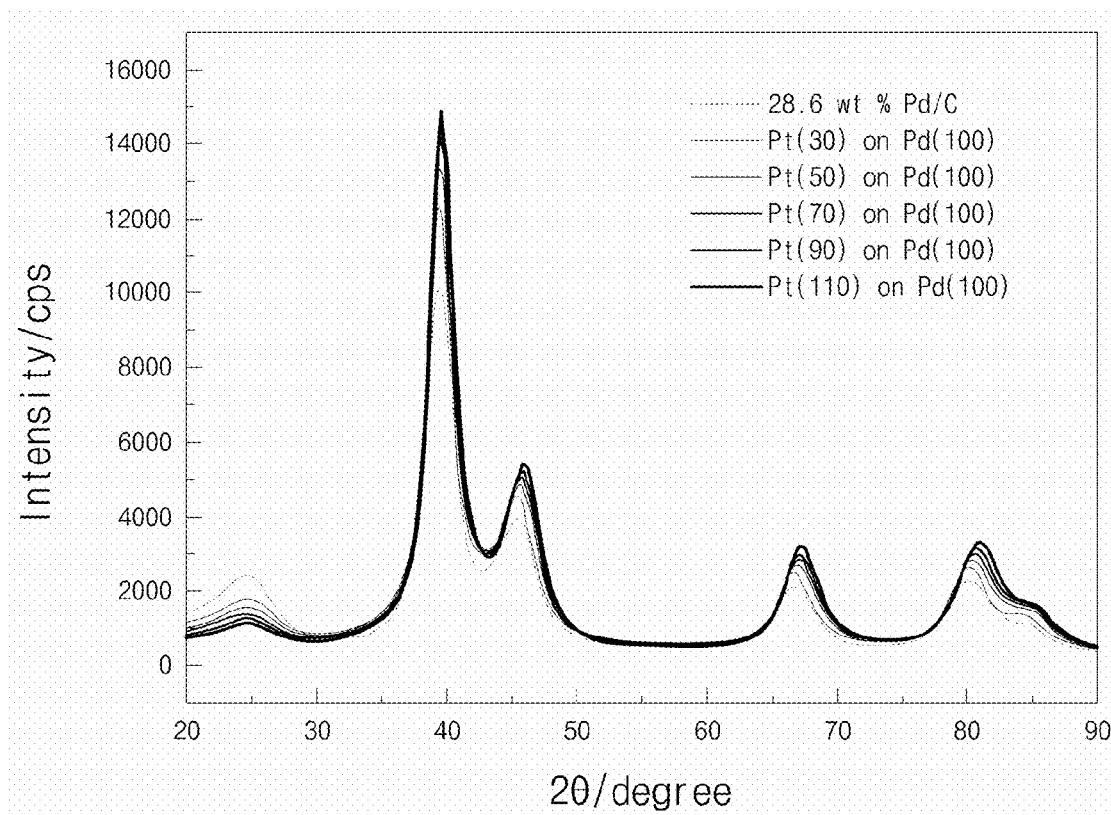
FIG. 3 shows powder X-ray diffraction patterns of Pd/Pt core-shell nanoparticles with Pt coated at various contents.

FIG. 3 shows powder X-ray diffraction patterns of the Pd/Pt core-shell nanoparticles. The powder X-ray diffraction patterns of Pd/Pt catalysts with Pt coated at various contents are shown along with that of Pd/C. It is to be noted that the increase of peak area for each crystal plane is not so large when considering the addition amount of Pt, although Pt has almost twice as many electrons as Pd. This means that the Pt atoms are coated on the surface of the Pd nanoparticle. Also, it can be seen that the peaks move gradually toward the peak positions of pure Pt as the addition amount of Pt increases. This means that the diffraction pattern is affected by the Pd lattice when the Pt atoms are coated on the Pd particles at a monolayer level, but it is gradually affected by Pt as the Pt coating layer becomes thicker. This also reveals that Pt are very uniformly coated on the surface of Pd. However, the successful coating may be more clearly seen from electrochemical performance, i.e. oxygen reduction activity. If the samples wherein the proportion of Pt to Pd is smaller than 1:1 show comparable or better oxygen reduction activity as compared with commercially available 40 wt % Pt/C, it means that the core-shell has superior performance. This can be seen from FIG. 4.

Figure 4:
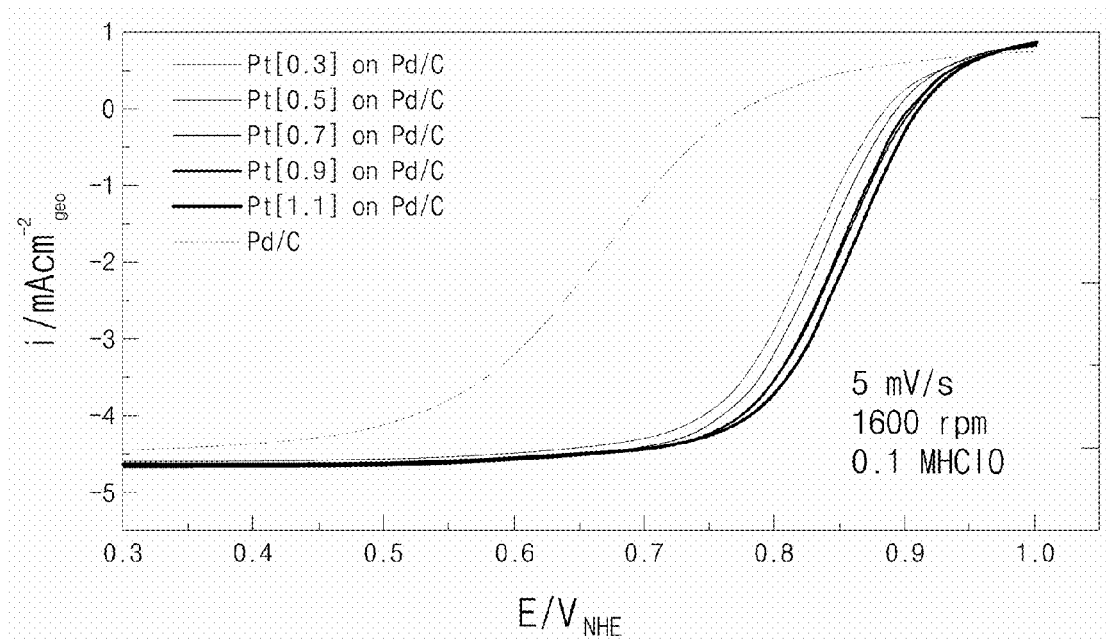
FIG. 4 shows current density in oxygen reduction of Pd/Pt core-shell nanoparticles with Pt coated at various contents.

FIG. 4 shows current density in oxygen reduction using a rotating disk electrode (RDE) plotted against potential. It shows the performance of the core-shell nanoparticles with various Pt contents. As seen from the figure, the current density exceeds that of pure platinum (half-wave potential=−0.85 V) as the Pt content increases. At 70% Pt, the performance is better than that of pure platinum.

While the present invention has been described with respect to the specific embodiments, it will be apparent to those skilled in the art that various changes and modifications may be made without departing from the spirit and scope of the invention as defined in the following claims.

What is claimed is:

1. A method for preparing core-shell nanoparticles supported on carbon, comprising:
   dispersing core nanoparticle powder supported on carbon in ethanol to prepare a dispersion;
   adding a metal precursor which forms a shell and hydroquinone to the dispersion to prepare a mixture solution; and
   coating the shell metal on the core nanoparticles by reducing the mixture solution by heating.
2. The method for preparing core-shell nanoparticles supported on carbon according to claim 1, wherein the core nanoparticles comprise one or more selected from the group consisting of: Ni, Pd, Co and Ir.

3. The method for preparing core-shell nanoparticles supported on carbon according to claim 1, wherein the ethanol, is anhydrous ethanol.

4. The method for preparing core-shell nanoparticles supported on carbon according to claim 1, wherein the metal precursor is one or more selected from the
group consisting of: $RuCl_3$, $RhCl_3$, $Pd(NO_3)_2$, $OsCl_3$, $IrCl_3$ and $PtCl_4$.

5. The method for preparing core-shell nanoparticles supported on carbon according to claim 1, wherein the reduction by heating is performed at 70-80° C.

6. A method for preparing core-shell nanoparticles supported on carbon, comprising:
dispersing core nanoparticle powder supported on carbon in ethanol to prepare a dispersion;
adding a metal precursor and hydroquinone to the dispersion to prepare a mixture solution; and
coating the shell metal on the core nanoparticles, thereby preparing core shell nanoparticles supported on carbon.

7. The method for preparing core-shell nanoparticles of claim 6, wherein the shell metal on the core nanoparticles is coated by reducing the mixture solution by heating.

* * * * *